(12) United States Patent
Romesburg

(10) Patent No.: US 7,050,575 B1
(45) Date of Patent: May 23, 2006

(54) ECHO CANCELER COEFFICIENT UPDATE APPARATUS AND METHOD

(75) Inventor: Eric Douglas Romesburg, Chapel Hill, NC (US)

(73) Assignee: Ericsson Inc., Research Triangle Park, NC (US)

( * ) Notice: Subject to any disclaimer, the term of this patent is extended or adjusted under 35 U.S.C. 154(b) by 1038 days.

(21) Appl. No.: 09/595,518

(22) Filed: Jun. 16, 2000

(51) Int. Cl.
H04M 9/08 (2006.01)

(52) U.S. Cl. .................................. 379/406.05; 370/289
(58) Field of Classification Search ................. 379/406
See application file for complete search history.

(56) References Cited

U.S. PATENT DOCUMENTS

| | | | |
|---|---|---|---|
| 5,283,784 A | | 2/1994 | Genter |
| 5,475,731 A | | 12/1995 | Rasmusson |
| 5,559,881 A | * | 9/1996 | Sih .......................... 379/406.08 |
| 5,737,410 A | * | 4/1998 | Vahatalo et al. ......... 379/406.08 |
| 5,835,851 A | | 11/1998 | Rasmusson et al. |
| 6,031,908 A | * | 2/2000 | Laberteaux et al. ..... 379/406.09 |
| 6,148,078 A | | 11/2000 | Romesburg |
| 6,160,886 A | | 12/2000 | Romesburg |
| 6,163,608 A | | 12/2000 | Romesburg |
| 6,181,793 B1 | * | 1/2001 | Laberteaux et al. ..... 379/406.08 |
| 6,185,300 B1 | | 2/2001 | Romesburg |
| 6,185,424 B1 | * | 2/2001 | Pon et al. .................... 455/445 |
| 6,301,357 B1 | | 10/2001 | Romesburg |

OTHER PUBLICATIONS

Eriksson et al. "Mobile Crosstalk Control—Enhancing Speech Quality in Digital Cellular Networks," *Ericsson Review*. No. 2, 1998, pp. 83–86.

Sui et al. "A Nonlinear Processing Technique for Removing Residual Echo in Communication Networks," *AT&T Laboratories, Advanced Communication Laboratory.* pp. 404–405.

* cited by examiner

*Primary Examiner*—Minsun Oh Harvey
*Assistant Examiner*—Walter F. Briney, III
(74) *Attorney, Agent, or Firm*—Myers Bigel Sibley & Sajovec

(57) ABSTRACT

An echo canceler and method for a communications system include an echo-containing signal input for receiving a signal and an echo-causing signal source for developing an echo-causing signal. A first filter coupled to the echo-containing signal input and the echo-causing signal source filters the echo-containing signal over a predetermined time period using an existing filter coefficient set to provide a first echo-canceled output signal at a first filter output mode. A trial filter is coupled to the echo-containing signal input and the echo-causing signal source for processing the echo-containing signal over a predetermined time period using a trial filter coefficient set to provide a trial echo-cancel output signal at the trial filter output mode. A controller coupled to the echo-containing signal input, the echo-causing signal source, the first filter output mode, and the trial filter output mode periodically recalculates the trial coefficient set, calculates a first energy value of the echo-canceled output signal over the predetermined time period, calculates a trial energy value of the trial echo-canceled output signal over the predetermined time period and determines if the echo-containing signal is dominated by echo. The existing filter coefficient set is updated with the trial coefficient set where the echo-containing signal is dominated by echo and the trial energy is less than the first energy.

46 Claims, 2 Drawing Sheets

ECHO CANCELER COEFFICIENT UPDATE APPARATUS AND METHOD

BACKGROUND OF THE INVENTION

The present invention is directed to communications systems and devices, and more particularly, to an apparatus and method for echo canceler coefficient update in communications systems and devices.

Echo cancelers are often used to suppress both acoustic-type echo (echoes resulting from feedback between a microphone and a closely situated speaker) and network-type echo (echoes caused by the network of communications links between users). Acoustic-type echo suppressers are typically used in mobile terminal (for example cellular telephone) handsets, mobile terminal hands-free devices, standard telephone handsets and standard telephone hands-free devices (for example speaker phones). Network-type echo suppressers are used in telephone networks, for example public switched telephone networks (PSTN), base stations and mobile switching centers (MSC).

An echo canceler has inputs for an echo-causing signal and an echo-containing signal. The echo-causing signal is often the signal supplied to a loudspeaker of the communications device. The echo-containing signal is typically a signal received at the microphone of the communications device including ambient noise, a desired voice from a user of the communications device, and an echo from the loudspeaker of the communications device.

Echo cancelers usually utilize a fixed Finite Impulse Response (FIR) filter and maintain a set of filter coefficients which, when convolved with samples of the echo-causing signal, provide an estimate of the echo portion for consecutive samples of the echo-containing signal. The samples of the echo portion estimate are subtracted from corresponding samples of the echo-containing signal, yielding an error signal as the echo suppressed output from the echo canceler.

In one echo canceler, used in Global System for Mobile Communications (GSM) mobile terminals, the error signal is fed back for use in updating the FIR filter coefficients. The filter coefficients are adapted constantly, but the update rate of the coefficients is slow to avoid divergence of the echo canceler. Divergence of the echo canceler occurs where the filter coefficients are changing to values which, when convolved with the echo-causing signal, are less representative of the echo portion of the echo-containing signal than previous filter coefficient values.

In another echo canceler, used as a network echo canceler in MSCs, a second, quickly-adapting FIR runs in parallel with a fixed FIR. The fixed FIR provides an echo-suppressed output, where the fixed FIR coefficients are used in providing the estimate of the echo portion of the echo-containing signal. A controller constantly adapts a second set of FIR coefficients for the quickly-adapting FIR on a sample per sample basis based on a quickly-adapting FIR echo-suppressed output. The quickly-adapting FIR provides the second echo-suppressed output using the second set of FIR coefficients. A fixed FIR energy reading is taken of the fixed FIR suppressed output over a time period of several seconds by the controller, and a second energy reading is taken of the second FIR suppressed output over the time period of several seconds by the controller, where the second set of FIR coefficients are updated as the fixed FIR coefficients where the second energy reading is less that the fixed FIR energy reading for the time period of several seconds. As the fixed FIR coefficients are only updated once over the time period of several seconds, useful updates to the second set of FIR coefficients are thrown away when followed by desired voice during the evaluation period, thus slowing the adaptation. Additionally, twice as much static RAM is required to hold the two sets of filter coefficients.

SUMMARY OF THE INVENTION

In accordance with an aspect of the invention, an echo canceler and method are provided for suppressing echo for a communications system including an echo-containing signal input for receiving a signal, and an echo-causing signal source for developing an echo-causing signal. A first filter is coupled to the echo-containing signal input and the echo-causing signal source for processing the echo-containing signal over a predetermined time period using an existing filter coefficient set to provide a first echo-canceled output signal at a first filter output node, and a trial filter is coupled to the echo-containing signal input and the echo-causing signal source for processing the echo-containing signal over a predetermined time period using a trial filter coefficient set to provide a trial echo-canceled output signal at a trial filter output node. A controller is coupled to the echo-containing signal input, the echo-causing signal source, the first filter output node, and the trial filter output node for periodically recalculating the trial coefficient set, calculating a first energy value of the first echo-canceled output signal over the predetermined time period, calculating a trial energy value of the trial echo-canceled output signal over the predetermined time period, determining if the echo-containing signal is dominated by echo, and updating the existing filter coefficient set with the trial coefficient set where the echo-containing signal is dominated by echo and the trial energy is less than the first energy.

In a feature of this aspect, the echo canceler includes a selector having first and second selector input nodes coupled to the first filter output node and the trial filter output node respectively, and having a selector output node for providing an echo-suppressed output signal, the selector responsive to the controller for connecting the trial filter output node to the selector output node where the echo-containing signal is dominated by echo and the trial energy is less than the first energy.

It is another feature that the first filter includes a first Finite Impulse Response Filter (FIR) coupled to the echo-causing signal source and the controller for filtering the echo-causing signal using the existing filter coefficient set to provide an estimate of the echo component at a first FIR output node, and a first adder coupled to the first FIR output node and the echo-containing signal input and having a first adder output node wherein the first adder output node is the first filter output node, the first adder for subtracting the estimate of the echo component from the echo-containing signal to provide the first filter echo-canceled output at the first adder output node.

In another feature, the trial filter includes a trial Finite Impulse Response Filter (FIR) coupled to the echo-causing signal source and the controller, for filtering the echo-causing signal using the trial filter coefficient set to provide an estimate of the echo component at a trial FIR output node, and a trial adder coupled to the trial FIR output node and the echo-containing signal input and having a trial adder output node wherein the trial adder output node is the trial filter output node, the trial adder for subtracting the estimate of the echo component from the echo-containing signal to provide the trial filter echo-canceled output at the trial adder output node.

In another feature of this aspect, the first filter captures a predetermined number of samples of an echo-causing signal and the echo-containing signal and processes the echo-containing signal for each of the predetermined number of samples of the echo-causing signal and the echo-containing signal, and provides a corresponding first echo-canceled output signal for each sample, and the controller includes a first energy calculator coupled to the first output filter node for calculating the first energy value by summing the squares of the first echo-canceled output signal for each of the corresponding first echo-canceled output signal samples over the predetermined time to period. In a further feature, the predetermined number of samples is 160.

In another feature, the trial filter captures a predetermined number of samples of an echo-causing signal and the echo-containing signal and processes the echo-containing signal for each of the predetermined number of samples of the echo-causing signal and the echo-containing signal, and provides a corresponding trial echo-canceled output signal for each sample, and the controller includes a trial energy calculator coupled to the trial output filter node for calculating the trial energy value by summing the squares of the trial echo-canceled output signal for each of the corresponding trial echo-canceled output signal samples over the predetermined time period.

In another feature yet, the controller includes an echo analyzer coupled to the echo-causing signal source and the echo-containing signal input for determining if the echo-containing signal is dominated by echo by capturing a predetermined number of samples of the echo-causing signal and the echo-containing signal over the predetermined time period, calculating a correlation function between the echo-containing signal and the echo-causing signal over a correlation window, calculating a first value using the correlation function over a portion of the correlation window where echo is expected, calculating a second value using the correlation function over a portion of the correlation window where no echo is expected, computing a status indicator as a function of the first value and the second value, where the status indicator is used in determining whether the echo-containing signal is dominated by echo.

In a further feature, the portion of the correlation window where no echo is expected is a last ½ of the correlation window, and the echo analyzer calculates the second value by calculating the second value from the last ½ of the correlation window.

In an alternate further feature, the portion of the correlation window where no echo is expected is a last ¼ of the correlation window, and the echo analyzer calculates the second value by calculating the second value from the last ¼ of the correlation window.

In a still further feature, the portion of the correlation window where echo is expected is a first ½ of the correlation window, and the echo analyzer calculates the first value by calculating the first value from the first ½ of the correlation window using the correlation function.

In another feature, the first value is a peak magnitude, and the echo analyzer calculates the peak magnitude by determining a maximum value of the correlation function during the potion of the correlation window where echo is expected.

In still a further feature yet, the second value is a baseline value, and the echo analyzer calculates the baseline value by calculating a Root Mean Square value of the correlation function over the portion of the correlation window where no echo is expected. In a further feature, the predetermined number of samples is 160.

In another feature, at least one of the first value and the second value used to compute the status indicator is proportional to an energy value of one of the first and second portions of the correlation window calculated by summing the squares of the correlation function over the one portion.

In yet another feature, at least one of the first value and the second value used to compute the status indicator is proportional to a norm of one of the first and second portions of the correlation window calculated by taking the square root of the sum of the squares of the correlation function over the one portion.

In another feature of this aspect, the controller includes an echo analyzer coupled to the echo-causing signal source and the first filter output node for determining if the echo-containing signal is dominated by echo by capturing a predetermined number of samples of the echo-causing signal and the first echo-canceled output signal over the predetermined time period, calculating a correlation function between the first echo-canceled output signal and the echo-causing signal over the correlation window, calculating a first value using the correlation function over a portion of the correlation window where echo is expected, calculating a second value using the correlation function over a portion of the correlation window where no echo is expected, computing the status indicator as a function of the first and second values, where the status indicator is used in determining whether the echo-containing signal is dominated by echo.

In another feature, the trial filter captures a predetermined number of samples of an echo-causing signal and the echo-containing signal and processes the echo-containing signal for each of the predetermined number of samples of the echo-causing signal and the echo-containing signal, and provides a corresponding trial echo-canceled output signal for each sample, and the controller modifies the trial coefficient set responsive to each sample of the corresponding trial echo-canceled output signal.

In yet another feature, the controller modifies the trial coefficient set after each predetermined time period.

In another feature, the communications system is a mobile communications system. In a further feature, the mobile communications system utilizes a Time Division Multiple Access (TDMA) architecture, and the predetermined time period is a TDMA time frame.

In another aspect of the invention, an echo analyzer and method are provided for determining if an echo-containing signal is dominated by echo including an echo-containing signal input for receiving a signal and an echo-causing signal source for developing an echo-causing signal. A controller is operatively connected to the echo-containing signal input and the echo-causing signal source for capturing a predetermined number of samples of the echo-containing signal and the echo-causing signal over a predetermined time period, calculating a correlation function between the echo-containing signal and the echo-causing signal over the correlation window, calculating a first value using the correlation function over a portion of the correlation window where echo is expected, calculating a second value using the correlation function over a portion of the correlation window where no echo is expected, computing a status indicator as a function of the first and second values, the status indicator used in determining whether the echo-containing signal is dominated by echo.

DETAILED DESCRIPTION OF THE INVENTION

Figure 1:
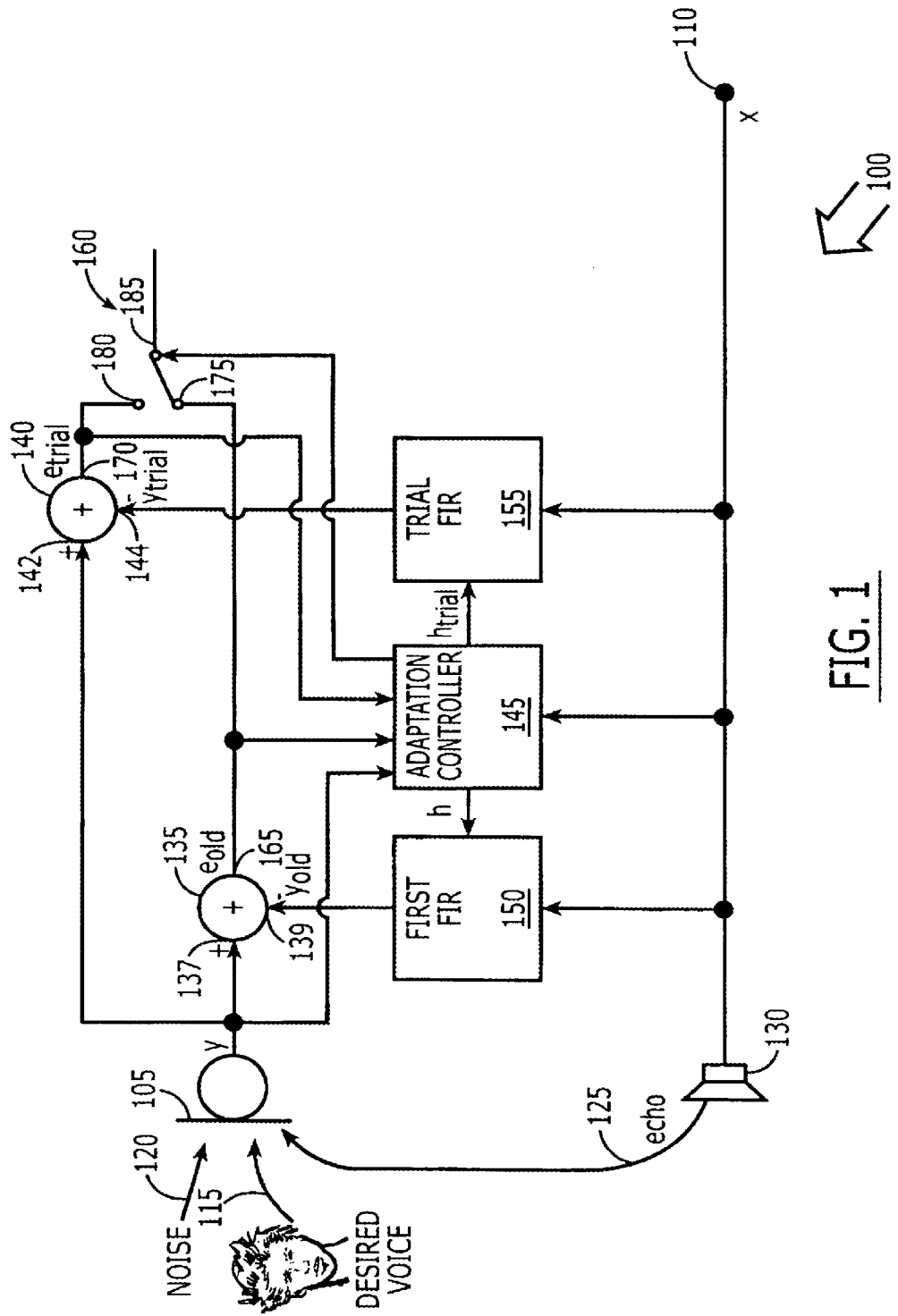
FIG. 1 illustrates an echo canceler in accordance with an embodiment of the invention.

FIG. 1 illustrates a block diagram of an echo canceler 100 in accordance with an embodiment of the invention. The echo canceler 100 includes an echo-containing signal input 105, for example a microphone, for receiving an echo-containing signal "u", and an echo-causing signal source 110 for developing an echo-causing signal "x". The echo-containing signal u includes a desired voice signal 115, an ambient noise signal 120, and an echo signal 125, where the echo signal 125 is produced by a loudspeaker 130 connected to the echo-causing signal source 110. The echo-containing signal input 105 is coupled to a first adder 135 at a first adder positive input 137, a trial adder 140 at a trial adder positive input 142, and an adaption controller 145. The adaptation controller 145 is coupled to a first Finite Impulse Response (FIR) filter 150 and a trial FIR filter 155, where the adaptation controller 145, the first FIR filter 150 and the trial FIR filter 155 are coupled to the echo-causing signal source 110. The first FIR filter 150 is coupled to a first adder inverting input 139, where the first FIR filter 150 provides a first echo estimate signal "$Y_{old}$" to the first adder 135 using existing filter coefficients "h". The trial FIR filter 155 is coupled to a trial inverting adder input 144, where the trial FIR filter provides a trial echo estimate signal "$y_{trial}$" to the trial adder 140 using trial filter coefficients "$h_{trial}$". The first adder and trial adder 135 and 140 are further coupled to a selector 160. More specifically, a first adder output 165 and a trial adder output 170 are coupled to respective selector first and second inputs 175 and 180. The first and trial adder outputs 165 and 170 are further coupled to the adaptation controller 145. The adaptation controller 145 is further coupled to the selector 160, for controlling the selector to choose one of the signals received at the selector first and second inputs 175 and 180 as an echo-suppressed output signal at a selector output 185. Operation of the echo-canceler 100 will be discussed with reference to the flowchart of FIG. 2.

Figure 2:
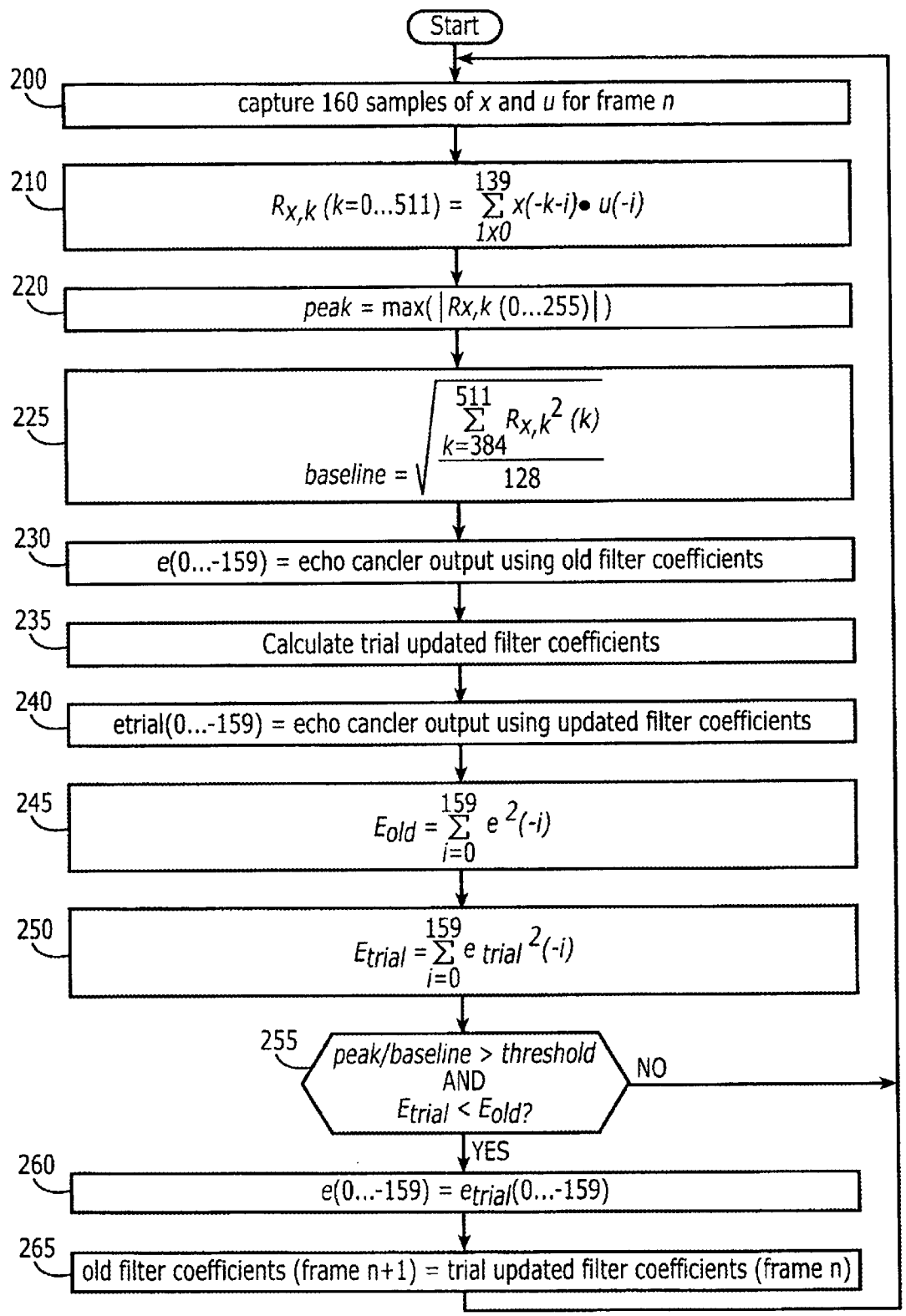
FIG. 2 is a flowchart illustrating operation of the echo canceler of FIG. 1.

FIG. 2 is a flowchart illustrating operation of the echo-canceler 100 in accordance with an embodiment of the invention. In step 200, 160 samples of x and u are captured by the adaptation controller 145 for a predetermined time period, for example a Time Division Multiple Access (TDMA) time frame of a digital mobile communications system. A correlation function between x and u is calculated over a correlation window by the adaptation controller 145 in step 210 as $$R_{x,u}(k = 0 \ldots 511) = \sum_{i=0}^{159} x(-k-i) \cdot u(-i)$$

given that u (0-1-2. . . -(M-1)), where u (0) is the newest sample of an M-length frame of signal u, and x (0-1-2. . . -(M+N-1)), where x (0) is the newest sample of an (M+N)-length delay line on signal x. For TDMA systems that already process audio signals and frames of 160 samples, it is convenient to use M=160, and for example, in the acoustic-echo canceler example of the disclosure, the correlation is evaluated over the correlation window of up to 512 taps, so N=512 in the above equation. k spans the correlation window. Samples of x and u from previous predetermined time periods which are used in calculating the correlation function $R_{x,u}$ are retrieved from, for example, a first-in first-out buffer as would be known by one skilled in the art.

Once the correlation function between x and u is calculated, a peak magnitude is determined at the adaptation controller 145 as shown in step 220, where $$\text{peakmagnitude} = \max\ (|R_{x,u}(0 \ldots 255)|)$$

and the peak magnitude is calculated from a first portion of the correlation window where echo is expected. The portion of the correlation window where echo is expected is determined experimentally, as would be known by one skilled in the art, and is for example, for a vehicle hands-free echo canceler, the first 256 taps of the correlation function between x and u, as the echo impulse response decays to less than 1% of its peak after the first 256 taps.

Once the peak magnitude is determined in step 220, a baseline echo value is determined at the adaptation controller 145, step 225, as $$\text{baseline} = \sqrt{\frac{\sum\limits_{k=384}^{511} R_{x,u}^2(k)}{128}}$$

where the base line value is calculated from a second portion of the correlation function where no echo is expected. For example, in a vehicle hands-free echo canceler, this second portion may be a final one-half of the delay taps (257 to 512), but is ideally the last one-quarter of the delay taps, taps 384 to 512. A high correlation between signals x and u from taps 384 to 512 will most likely only occur during high noise and/or desired voice. Echo voice is typically only detected when there is a high peak correlation for the low-delay taps (taps 0 to 256 in this example), relative to the Root Mean Square (RMS) for the correlation on high-delay taps (taps 384 to 512 in this example).

In step 230, a first FIR filter 150 output is calculated at the first FIR filter 150 for the 160 samples of x. The first FIR filter output is calculated using the existing FIR coefficients "h" provided by the adaptation controller 145 and represents the first echo estimate due to the echo-causing signal x within the echo-containing signal u. The output $Y_{old}$ is applied to the first adder 135 at the first adder inverting input 139 for each of the 160 samples of x and u during the predetermined time period. The first echo estimate $y_{old}$ is subtracted from the echo-containing signal u to yield an error signal end at the first adder output 165.

In step 235, the trial filter coefficients "$h_{trial}$" are calculated within the adaptation controller 145 using the error signal $e_{old}$ where the trial filter coefficients are used by the trial FIR filter 155 to calculate the trial echo estimate $y_{trail}$, as shown in step 240. The trial echo estimate $y_{trial}$ is provided to the trial adder inverting input 144, where the trial adder 140 subtracts the trial echo estimate from the echo-containing signal u to provide a trial error signal $e_{trial}$ at the trial adder output 170. One skilled in the art would realize that the trial filter coefficients may be calculated on a sample per sample basis where a sample of the trial error signal $e_{trial}$ for each corresponding sample of x and u is received by the adaptation controller 145 and used to calculate the trial filter coefficients. Alternatively, one skilled in the art would realize that the trial filter coefficients may be calculated by the adaptation controller 145 at the end of the predetermined time period once all 160 samples of $e_{old}$ have been calculated and received at the adaptation controller.

Once the echo canceler outputs have been calculated using both the existing filter coefficients and the trial filter coefficients, steps 230 and 240, an energy value is calculated at the adaptation controller 145 for the outputs of the first adder 135 and the trial adder 140 over the predetermined time period, where the energy of the error signal $e_{old}$ at the first adder output 165 is summed over the 160 samples as $$E_{old} = \sum_{i=0}^{159} e^2(-i)$$

and the energy of the trial error signal $e_{trial}$ at the trial adder output 170 is summed over the 160 samples as $$E_{trial} = \sum_{i=0}^{159} e_{trial}^2(-i)$$

where $E_{old}$ and $E_{trial}$ are calculated by summing respectively the squares of $e_{old}$ and $e_{trial}$ over the 160 samples of the predetermined time period, as shown in steps 245 and 250.

In step 255, it is determined whether the echo-containing signal u is dominated by echo at the adaptation controller 145, for example by an echo-analyzer contained within the adaptation controller, and the energy calculation $E_{trial}$ is compared with $E_{old}$. The determination of whether the echo-causing signal u is dominated by echo is made by computing a status indicator as a function of a first value calculated from a first portion of the correlation window where echo is expected, and a second value calculated over a second portion of the correlation window where no echo is expected. In this embodiment, the first value is the peak magnitude, and the second value is the baseline value. The status indicator is computed as the peak magnitude divided by the baseline value, and is compared with a predetermined threshold to determine if the echo-containing signal u is dominated by echo. Where the peak magnitude divided by the baseline is greater than the predetermined threshold, it is determined that the echo-containing signal u is dominated by echo. Where the peak/baseline is greater than the predetermined threshold and the $E_{trial}$ is less than $E_{old}$, the adaptation controller 145 replaces the existing filter coefficients for the first FIR old with the trial filter coefficients, as shown in step 260. In a next predetermined time period (frame N+1), the adaptation controller 145 provides the first FIR filter 150 with the trial filter coefficients from the previous predetermined time period (frame N), step 265, and the adaptation controller 145 actuates the selector 160 to select the second selector input 180 as the echo canceler output at selector output 185. The method then returns to 200 where 160 samples of x and u are captured for a predetermined time period. However, where one of the peak/baseline is not greater than the threshold or the $E_{trial}$ is not less than the $E_{old}$ in step 255, the adaptation controller 145 actuates the selector 160 to select the first selector input 175 as the echo canceler output at selector output 185 and method returns to step 200 and the adaptation controller 145 does not update the existing filter coefficients with the trial filter coefficients.

Although the first and second values are the peak magnitude and the baseline value in this embodiment, one skilled in the art would realize that they are not limited thereto. For example, at least one of the first and second values may be proportional to an energy value of one of the first and second portions of the correlation window calculated by summing the squares of the correlation function over the respective portion, or the first and second values may be proportional to a norm of the first and second portions of the correlation window calculated by taking the square root of the sum of the squares of the correlation function over the respective portion. Additionally, in determining whether the echo-containing signal is dominated by echo, a correlation function between $e_{old}$ and x may be used instead of the correlation function between x and u in determining the peak magnitude and the baseline values, as is known by one skilled in the art and described in U.S. patent application Ser. No. 08/852,729, "An Improved Echo Canceler For Use In Communications Systems" to Romesburg. Alternatively, a correlation function between $e_{trial}$ and x may be used to calculate the peak magnitude and the baseline values in determining whether the echo-containing signal is dominated by echo.

In a further embodiment (not shown), a third selector input is provided on the selector 160 where the third selector input is connected to the echo-containing signal input 105. The adaptation controller 145 further calculates the energy of the echo-containing signal u over the predetermined time period, and actuates the selector 160 to cause the echo-containing signal provided at the third selector input to be provided at the selector output 185 where the energy of the echo-containing signal u over the predetermined time period is less than $E_{old}$ and $E_{trial}$. Where the energy of the echo-containing signal u over the predetermined time period is less than $E_{old}$ and $E_{trial}$, the echo canceler is diverging and it is advantageous to provide the echo-containing signal u as the echo canceler output.

In an alternate embodiment (not shown), the selector 160 is not provided. In this case, the trial adder output 170 is coupled only to the adaptation controller 145, and the first adder output 165 provides the echo canceled output from the echo canceler 100.

Using the peak/baseline calculation in determining whether the echo-containing signal is dominated by echo allows updates to the filter coefficients right up to when the desired voice starts, and it permits updates to resume immediately when the desired voice ends. Further, using a correlation between u and x in determining whether the signal is dominated by echo is advantageous over using the correlation between $e_{old}$ or $e_{trial}$ and x. This is true because as the echo canceler is trained, $e_{old}$ and $e_{trial}$ contain less and less echo-causing the correlation between $e_{old}$ or $e_{trial}$ and x to be lower. A lower correlation between $e_{old}$ and x causes a lower peak magnitude, making it more difficult to distinguish echo-only speech from double talk. In contrast, using the correlation between u and x gives equal performance regardless of how well the echo canceler is trained.

Additionally using the energy-based verification between $E_{trial}$ and $E_{old}$ prevents updates during periods of high distortion in the echo path 125, such as is typical with hands-free loudspeakers on peaks. It also prevents updates when the correlation on the high-delay taps are low only because the leading edge of desired voice has not yet propagated that far into the delay line. Having the double verification of whether the echo-containing signal is dominated by echo and the energy based verification thus helps to avoid updates of the existing filter coefficients with the trial filter coefficients over a wide range of inappropriate conditions, yet takes advantage of all frame updates that are useful for faster adaptation. In addition, as the echo canceler output is calculated for both the existing filter coefficients and the trial coefficients over the predetermined time period, for example a TDMA time frame, the trial coefficients need not be saved separately from the existing filter coefficients for a next time frame as the trial filter coefficients are either copied as the existing filter coefficients or rejected, thereby allowing the trial coefficients to be stored in temporary rather than static memory, thereby greatly decreasing the resources used by the adaptation controller.

It would be apparent to one skilled in the art that the functions performed in the blocks 135, 140, 145, 150 and 155 may be performed by a program running on a programmed processor, a digital signal processor, or an Application Specific Integrated Circuit (ASIC).

Although the invention has been described in the context of a TDMA communications system, one skilled in the art would realize that the invention is not limited to such as may be advantageously carried out in, for example, GSM and CDMA communications systems. Additionally, although the predetermined time period and M have been described as consisting of 160 samples, the number 160 is given by way of example, and not as a limitation as the predetermined time period and M may consist of any number of signal samples to achieve the advantages of the invention. In addition, although the invention has been described in the context of acoustic echo-cancelers, one skilled in the art would realize that the teachings herein are equally applicable to network echo cancelers, for example network echo cancelers as shown in U.S. patent application, Ser. No. 09/511,810, "Apparatus And Methods For Selective Echo Compensation" to Romesburg, hereby incorporated by reference herein.

Still other aspects, objects and advantages of the present invention can be obtained from a study of the specification, the drawings, and the appended claims. It should be understood, however, that the present invention could be used in alternate forms where less than all of the objects and advantages of the present invention and preferred embodiments as described above would be obtained.

I claim:

1. A method for canceling echo for a communications device comprising:
    storing an existing coefficient set;
    periodically calculating a trial filter coefficient set;
    processing an echo-containing signal over a predetermined time period using the existing filter coefficient set to provide a first echo-canceled output signal;
    processing the echo-containing signal over the predetermined time period using the trial filter coefficient set to provide a trial echo-canceled output signal;
    calculating a first energy value of the first echo-canceled output over the predetermined time period;
    calculating a trial energy value of the trial echo-canceled output over the predetermined time period;
    determining if the echo-containing signal is dominated by echo, comprising
        capturing a predetermined number of samples of an echo-causing signal and the echo-containing signal over the predetermined time period;
        calculating a correlation function between the echo-containing signal and the echo-causing signal over a correlation window;
        calculating a first value using the correlation function over a portion of the correlation window where echo is expected;
        calculating a second value using the correlation function over a portion of the correlation window where no echo is expected, wherein the second value is a baseline value and calculating the baseline value comprises calculating a Root Mean Square value of the correlation function over the portion of the correlation window where no echo is expected; and
        computing a status indicator as a function of the first value and the second value, the status indicator used for determining whether the echo-containing signal is dominated by echo; and
    updating the existing filter coefficient set with the trial coefficient set where the echo-containing signal is dominated by echo and the trial energy is less than the first energy.

2. The method of claim 1 wherein the step of processing the echo-containing signal to provide the first echo-canceled output signal comprises:
    filtering an echo-causing signal using the existing filter coefficient set to provide an estimate of the echo component; and
    subtracting the estimate of the echo component from the echo-containing signal to provide the first echo-canceled output signal.

3. The method of claim 1 wherein the step of processing the echo-containing signal to provide the trial echo-canceled output signal comprises:
    filtering an echo-causing signal using the trial filter coefficient set to provide an estimate of the echo component; and
    subtracting the estimate of the echo component from the echo-containing signal to provide the trial echo-canceled output signal.

4. The method of claim 1 wherein the portion of the correlation window where no echo is expected is a last ½ of the correlation window, and the step of calculating the second value comprises calculating the second value from the last ½ of the correlation window.

5. The method of claim 1 wherein the portion of the correlation window where no echo is expected is a last ¼ of the correlation window, and the step of calculating the second value comprises calculating the second value from the last ¼ of the correlation window.

6. The method of claim 1 wherein the portion of the correlation window where echo is expected is a first ½ of the correlation window, and the step of calculating the first value comprises calculating the first value from the first ½ of the correlation window using the correlation function.

7. The method of claim 1 wherein the first value is a peak magnitude, and the step of calculating the peak magnitude comprises determining a maximum value of the correlation function during a portion of the correlation window where echo is expected.

8. The method of claim 1 wherein the step of determining if the echo-containing signal is dominated by echo comprises:
    capturing a predetermined number of samples of an echo-causing signal and the first echo-canceled output signal over the predetermined time period;
    calculating a correlation function between the first echo-canceled output signal and the echo-causing signal over a correlation window;
    calculating a first value using the correlation function over a portion of the correlation window where echo is expected;
    calculating a second value using the correlation function over a portion of the correlation window where no echo is expected; and
    computing a status indicator as a function of the first value and the second value, the status indicator used for determining whether the echo-containing signal is dominated by echo.

9. The method of claim 1 further comprising:
    capturing a predetermined number of samples of an echo-causing signal and the echo-containing signal;

wherein the step of processing the echo-containing signal to provide the first echo-canceled output signal comprises processing the echo-containing signal for each of the predetermined number of samples of the echo-causing signal and the echo-containing signal, and providing a corresponding first echo-canceled output signal for each sample, and the step of calculating the first energy value comprises summing the squares of the first echo-canceled output signal for each of the corresponding first echo-canceled output signal samples over the predetermined time period.

10. The method of claim 1 further comprising:

capturing a predetermined number of samples of an echo-causing signal and the echo-containing signal;

wherein the step of processing the echo-containing signal to provide the trial echo-canceled output signal comprises processing the echo-containing signal for each of the predetermined number of samples of the echo-causing signal and the echo-containing signal, and providing a corresponding trial echo-canceled output signal for each sample, and the step of calculating the trial energy value comprises summing squares of the trial echo-canceled output signal for each of the corresponding trial echo-canceled output signal samples over the correlation window.

11. The method of claim 1 further comprising:

capturing a predetermined number of samples of an echo-causing signal and the echo-containing signal;

wherein the step of processing the echo-containing signal to provide the trial echo-canceled output signal comprises processing the echo-containing signal for each of the predetermined number of samples of the echo-causing signal and the echo-containing signal using the trial filter coefficient set, and providing a corresponding trial echo-canceled output signal for each sample, and modifying the trial filter coefficient set responsive to each sample of the corresponding trial echo-canceled output signal.

12. The method of claim 1 further comprising:

modifying the trial filter coefficient set after the predetermined time period.

13. The method of claim 1 further comprising:

selecting the trial echo-canceled output as an output where the echo-containing signal is dominated by echo and the trial energy is less than the first energy.

14. The method of claim 1 wherein the communications device is operable in a cellular system utilizing a Time Division Multiple Access (TDMA) architecture, and the predetermined time period is a TDMA time frame.

15. A method for determining whether an echo-containing signal is dominated by echo comprising:

capturing a predetermined number of samples of an echo-causing signal and the echo-containing signal over a predetermined time period;

calculating a correlation function between the echo-containing signal and the echo-causing signal over a correlation window;

calculating a first value using the correlation function over a first portion of the correlation window where echo is expected;

calculating a second value using the correlation function over a second portion of the correlation window where no echo is expected, wherein the second value is a baseline value and calculating the baseline value comprises calculating a Root Mean Square value of the correlation function over the portion of the correlation window where no echo is expected; and computing a status indicator as a function of the first value and the second value, the status indicator used for determining whether the echo-containing signal is dominated by echo.

16. The method of claim 15 wherein the portion of the correlation window where no echo is expected is a last ½ of the correlation window, and the step of calculating the second value comprises calculating the second value from the last ½ of the correlation window.

17. The method of claim 15 wherein the portion of the correlation window where no echo is expected is a last ¼ of the correlation window, and the step of calculating the second value comprises calculating the second value from the last ¼ of the correlation window.

18. The method of claim 15 wherein the portion of the correlation window where echo is expected is a first half of the correlation window, and the step of calculating the first value comprises calculating the first value from the first ½ of the correlation window using the correlation function.

19. The method of claim 15 wherein the first value is a peak magnitude, and the step of calculating the peak magnitude comprises determining a maximum value of the correlation function during the portion of the correlation window where echo is expected.

20. The method of claim 15 wherein at least one of the first value and the second value used to compute the status indicator is proportional to an energy value of one of the first and second portions of the correlation window calculated by summing the squares of the correlation function over the one portion.

21. The method of claim 15 wherein at least one of the first value and the second value used to compute the status indicator is proportional to a norm of one of the first and second portions of the correlation window calculated by taking the square root of the sum of the squares of the correlation function over the one portion.

22. An echo canceler for a communications system comprising:

an echo-containing signal input for receiving a signal;

an echo-causing signal source for developing an echo-causing signal;

a first filter coupled to the echo-containing signal input and the echo-causing signal source for processing the echo-containing signal over a predetermined time period using an existing filter coefficient set to provide a first echo-canceled output signal at a first filter output node;

a trial filter coupled to the echo-containing signal input and the echo-causing signal source for processing the echo-containing signal over a predetermined time period using a trial filter coefficient set to provide a trial echo-canceled output signal at a trial filter output node;

a controller coupled to the echo-containing signal input, the echo-causing signal source, the first filter output node, and the trial filter output node for periodically recalculating the trial coefficient set, calculating a first energy value of the first echo-canceled output signal over the predetermined time period, calculating a trial energy value of the trial echo-canceled output signal over the predetermined time period, determining if the echo-containing signal is dominated by echo, and updating the existing filter coefficient set with the trial coefficient set where the echo-containing signal is dominated by echo and the trial energy is less than the first energy, the controller comprising an echo analyzer coupled to the echo-causing signal source and the echo-containing signal input for determining if the echo-containing signal is dominated by echo by capturing a predetermined number of samples of the echo-causing signal and the echo-containing signal over the predetermined time period, calculating a correlation function between the echo-containing signal and the echo-causing signal over a correlation window, calculating a first value using the correlation function over a portion of the correlation window where echo is expected, calculating a second value using the correlation function over a portion of the correlation window where no echo is expected, wherein the second value is a baseline value and the echo analyzer calculates the baseline value by calculating a Root Mean Square value of the correlation function over the portion of the correlation window where no echo is expected, computing a status indicator as a function of the first value and the second value, the status indicator used for determining whether the echo-containing signal is dominated by echo.

23. The echo canceler of claim 22 further comprising a selector having first and second selector input nodes coupled to the first filter output node and the trial filter output node respectively, and having a selector output node for providing an echo-suppressed output signal, the selector responsive to the controller for connecting the trial filter output node to the selector output node where the echo-containing signal is dominated by echo and the trial energy is less than the first energy.

24. The echo canceler of claim 22 wherein the first filter comprises:
a first Finite Impulse Response Filter (FIR) coupled to the echo-causing signal source and the controller, for filtering the echo-causing signal using the existing filter coefficient set to provide an estimate of the echo component at a first FIR output node; and
a first adder coupled to the first FIR output node and the echo-containing signal input and having a first adder output node wherein the first adder output node is the first filter output node, the first adder for subtracting the estimate of the echo component from the echo-containing signal to provide the first filter echo-canceled output at the first adder output node.

25. The echo canceler of claim 22 wherein the trial filter comprises:
a trial Finite Impulse Response Filter (FIR) coupled to the echo-causing signal source and the controller, for filtering the echo-causing signal using the trial filter coefficient set to provide an estimate of the echo component at a trial FIR output node; and
a trial adder coupled to the trial FIR output node and the echo-containing signal input and having a trial adder output node wherein the trial adder output node is the trial filter output node, the trial adder for subtracting the estimate of the echo component from the echo-containing signal to provide the trial filter echo-canceled output at the trial adder output node.

26. The echo canceler of claim 22 wherein the first filter captures a predetermined number of samples of an echo-causing signal and the echo-containing signal and processes the echo-containing signal for each of the predetermined number of samples of the echo-causing signal and the echo-containing signal, and provides a corresponding first echo-canceled output signal for each sample, and the controller includes a first energy calculator coupled to the first output filter node for calculating the first energy value by summing the squares of the first echo-canceled output signal for each of the corresponding first echo-canceled output signal samples over the predetermined time period.

27. The echo canceler of claim 26 wherein the predetermined number of samples is 160.

28. The echo canceler of claim 22 wherein the trial filter captures a predetermined number of samples of an echo-causing signal and the echo-containing signal and processes the echo-containing signal for each of the predetermined number of samples of the echo-causing signal and the echo-containing signal, and provides a corresponding trial echo-canceled output signal for each sample, and the controller includes a trial energy calculator coupled to the trial output filter node for calculating the trial energy value by summing the squares of the trial echo-canceled output signal for each of the corresponding trial echo-canceled output signal samples over the predetermined time period.

29. The echo canceler of claim 22 wherein the portion of the correlation window where no echo is expected is a last ½ of the correlation window, and the echo analyzer calculates the second value by calculating the second value from the last ½ of the correlation window.

30. The echo canceler of claim 22 wherein the portion of the correlation window where no echo is expected is a last ¼ of the correlation window, and the echo analyzer calculates the second value by calculating the second value from the last ¼ of the correlation window.

31. The echo canceler of claim 22 wherein the portion of the correlation window where echo is expected is a first ½ of the correlation window, and the echo analyzer calculates the first value by calculating the first value from the first ½ of the correlation window using the correlation function.

32. The echo canceler of claim 22 wherein the first value is a peak magnitude, and the echo analyzer calculates the peak magnitude by determining a maximum value of the correlation function during the portion of the correlation window where echo is expected.

33. The echo canceler of claim 22 wherein the predetermined number of samples is 160.

34. The echo canceler of claim 22 wherein the controller includes an echo analyzer coupled to the echo-causing signal source and the first filter output node for determining if the echo-containing signal is dominated by echo by capturing a predetermined number of samples of the echo-causing signal and the first echo-canceled output signal over the predetermined time period, calculating a correlation function between the first echo-canceled output signal and the echo-causing signal over a correlation window, calculating a first value using the correlation function over a portion of the correlation window where echo is expected, calculating a second value using the correlation function over a portion of the correlation window where no echo is expected, computing a status indicator as a function of the first value and the second value, the status indicator used for determining whether the echo-containing signal is dominated by echo.

35. The echo canceler of claim 22 wherein the trial filter captures a predetermined number of samples of an echo-causing signal and the echo-containing signal and filters the echo-containing signal for each of the predetermined number of samples of the echo-causing signal and the echo-containing signal, and provides a corresponding trial echo-canceled output signal for each sample, and the controller modifies the trial coefficient set responsive to each sample of the corresponding trial echo-canceled output signal.

36. The echo canceler of claim 22 wherein the controller modifies the trial coefficient set after each predetermined time period.

37. The echo canceler of claim 22 wherein the communications system is a mobile communications system.

38. The echo canceler of claim 37 wherein the mobile communications system utilizes a Time Division Multiple Access (TDMA) architecture, and the predetermined time period is a TDMA time frame.

39. An echo analyzer for determining if an echo-containing signal is dominated by echo comprising:
- a echo-containing signal input for receiving a signal;
- an echo-causing signal source for developing an echo-causing signal; and
- a controller operatively connected to the echo-containing signal input and the echo-causing signal source for capturing a predetermined number of samples of the echo-containing signal and the echo-causing signal over a predetermined time period, calculating a correlation function between the echo-containing signal and the echo-causing signal over a correlation window, calculating a first value using the correlation function over a portion of the correlation window where echo is expected, calculating a second value using the correlation function over a portion of the correlation window where no echo is expected, wherein the second value is a baseline value and the controller calculates the baseline value by calculating a Root Mean Square value of the correlation function over the portion of the correlation window where no echo is expected, computing a status indicator as a function of the first value and the second value, the status indicator used for determining whether the echo-containing signal is dominated by echo.

40. The echo analyzer of claim 39 wherein the portion of the correlation window where no echo is expected is a last ½ of the correlation window, and the controller calculates the second value by calculating the second value from the last ½ of the correlation window.

41. The echo analyzer of claim 39 wherein the portion of the correlation window where no echo is expected is a last ¼ of the correlation window, and the controller calculates the second value by calculating the second value from the last ¼ of the correlation window.

42. The echo analyzer of claim 39 wherein the portion of the correlation window where echo is expected is a first ½ of the correlation window, and the controller calculates the first value by calculating the first value from the first ½ of the correlation window using the correlation function.

43. The echo analyzer of claim 39 wherein the first value is a peak magnitude, and the controller calculates the peak magnitude by determining a maximum value of the correlation function during the portion of the correlation window where echo is expected.

44. The echo analyzer of claim 39 wherein the predetermined number of samples is 160.

45. The echo analyzer of claim 39 wherein at least one of the first value and the second value used to compute the status indicator is proportional to an energy value of one of the first and second portions of the correlation window calculated by summing the squares of the correlation function over the one portion.

46. The echo analyzer of claim 39 wherein at least one of the first value and the second value used to compute the status indicator is proportional to a norm of one of the first and second portions of the correlation window calculated by taking the square root of the sum of the squares of the correlation function over the one portion.

* * * * *